3,551,193
WOOD SUBSTANCE AND THE PRODUCTION
PROCESS THEREOF
Hisao Suzuki, Fujisawa-shi, Akira Musashi and Shinzaburo Uo, Naka-gun, and Masami Yamazaki, Chigasaki-shi, Japan, assignors to Nippon Soda Co., Ltd., Tokyo, Japan, a corporation of Japan
No Drawing. Filed July 5, 1968, Ser. No. 742,552
Claims priority, application Japan, Aug. 31, 1968, 43/62,212; Sept. 26, 1968, 43/69,113
Int. Cl. B44d 1/28; B27k 3/34
U.S. Cl. 117—148          9 Claims

ABSTRACT OF THE DISCLOSURE

An improved wood substance having impregnated therein a conjugated diolefin homopolymer or copolymer material or a mixture thereof wherein the diolefin homopolymer or copolymer or mixture thereof has an average molecular weight in the range of 500 to 20,000 and at least fifty percent of the material consists of diolefin units having a 1,2-bond.

---

The present invention relates to an improved wood substance and the process of making said wood substance.

Artificially moulded fiber board, in which pulpified ligneous material is used as a main raw material, has found extensive use and scope e.g. as construction material, electric appliances, toy base material, lacquerware base material or the like. But, this material has a high hygroscopic property and further swells in size as a consequence of this hygroscopicity. So, prior to processing or fabricating, it is necessarily treated in a preliminary operation of moisture adjustment, and further, in the case of using it particularly in a place of high humidity, the back surface and the surface of its cut section is coated with a water proof coating or provided with water proof paper lamina.

However, its mechanical strength e.g. flexibility is not satisfactory, and reinforcement is desirable in certain using purposes.

In the prior art, fiber board is made by impregnating the fiber board with a solution containing a resin as the main component, e.g. tall oil or its ester and processing the fiber board with heat treatment for the purpose of improving the above drawbacks and increasing the mechanical strength of the fiber board. However, according to the results of tests, the inventors have found that this process is effective for reducing hygroscopicity, but has no effect on improving the mechanical strength.

We examined various processes for improving the quality of processed ligneous product and as a result we have found that, if the processed ligneous product is treated with a polymeric material having as one of the components thereof a conjugated diolefin polymer having a 1,2-bond unit in the polymeric chain structure, e.g. a 1,2-bond unit represented by a structural formula of:

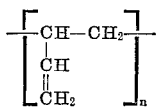

then the processed ligneous product has improved qualities in humidity resistance, mechanical strength and dielectric property which can be obtained in a brief time and by simple operation.

In other words, the present invention relates to improved wood substances such as fiber board, chip board and the process for producing and processing ligneous products which comprises impregnating the said products with a conjugated diolefin homopolymer or copolymer, having an average molecular weight, in the range of from about 500 to about 20,000, wherein there is at least about 50 percent or more of the 1,2-bond diolefin unit in the polymeric chain structure, and having or not having functional groups on the polymeric chain together with, if desired, a vinyl compound and/or a setting catalyst and other additives, and curing the said product.

According to the present invention, the ligneous material to be processed is immersed in the above mixture or solution comprising the polymer mixture and solvent or emulsified solution comprising the polymer mixture, emulsifier and water at room temperature or an elevated temperature up to 300° C. under normal pressure, under a reduced pressure or positive pressure, and otherwise, the said processed ligneous material may also be impregnated by the above mixture by means of spraying, roll coating, brush coating or other analogous means on a surface of the said material, and then said material is cured by maintaining it for an appropriate time at a normal or an elevated temperature under a normal or positive pressure.

According to the present invention, a conjugated diolefin polymer having an average molecular weight in the above mentioned range of 500 to 20,000 is employed. Because, if said polymer has a molecular weight of 500 or less, the curing rate is retarded and a satisfactory mechanical strength cannot be obtained; and if the polymer has a molecular weight of more than 20,000 it is too viscous and so, requires a long time for impregnation and is liable to give unhomogeneous impregnation. Further, if workability is taken in consideration, the polymer having a molecular weight in the range of about 2,000 to about 10,000 should preferably be employed. The above mentioned conjugated diolefin may comprise, e.g. butadiene, isoprene, 2, 3-dimethylbutadiene, cyclohexadiene or the like.

As the conjugated diolefin polymer in the present invention possesses a relatively lower molecular weight in the range of so-called oligomer, as mentioned above, on the one hand it allows very rapid impregnation, compared with a polymer having the higher molecular weight and on the other hand, is capable of being very easily cured as compared with a method of impregnating with a monomer and curing.

Therefore, an object for improving the quality of the wood substance can be achieved with a treatment in a brief time. It is considered that this rapid curing is brought about by the presence of a branched vinyl group in the 1,2-bond unit of the conjugated diene which has a high reactivity. Thereby, intermolecular cross linkage is easily carried out and a reticular structure is formed within the wood substance so that the mechanical strength of treated products is remarkably improved. Furthermore, the above polymer consists of a long chain hydrocarbon, so that said polymer keeps a comparatively flexible nature even after curing, the impact resistance of treated products does not deteriorate, and further has superior humidity resistance and electric insulation is improved because of the hygroscopic nature of the hydrocarbon chain.

In this invention, although the process for preparation of the conjugated diolefin polymer containing a 1,2-bond unit is not restricted to the particular method set forth hereinafter, a polymer having a high percentage of the 1,2-bond unit in the polymeric chain is preferably selected. Usually, said polymer has to have 50 percent or more of the 1,2-bond unit. Further, when the said polymer is required to cure at a somewhat low temperature or in a particularly short period of time, a polymer having 80 percent or more of the 1,2-bond is preferably used. Moreover, when the copolymer of conjugated diene is applied, it is necessary that the copolymer used has a sufficiently high content of 1,2-bond taking account of ratios and kinds of comonomers. Simply stated, the 1,2-bond unit is usually produced according to the following reaction:

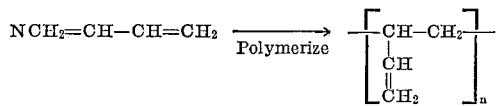

In practice the conjugated diolefin polymer which satisfies those above conditions may be produced by the examples described hereafter.

Preferably, the reaction is carried out in the presence of an aromatic hydrocarbon activator e.g. naphthalene or 1,2-diphenylbenzene. Butadiene, or a mixture of butadiene and a diluent is added to a Lewis base compound such as tetrahydrofuran containing a dispersed alkali metal e.g. lithium and sodium and the resulting mixed solution of the polymerization reaction is treated with water or a reagent having an active hydrogen atom e.g. methanol or acetic acid and thereby the butadiene homopolymer is obtained. If comonomer e.g. styrene is added together with butadiene alternatively or a mixture of the said comonomer and butadiene is concurrently or successively added into the above Lewis base and the resulting solution of the polymerization reaction is treated with the reagent having active hydrogen atom, the butadiene copolymer is obtained.

Also, a conjugated diolefin other than butadiene e.g. isoprene may be employed together with or instead of butadiene.

The conjugated diolefin homopolymer or copolymer obtained as described above contains a 1,2-bond unit in a range of 80 to 95 percent of the diolefin unit in the polymeric chain.

The comonomer which can be employed for the conjugated diolefin copolymer in the above mentioned producing process is selected from the group consisting of acrylonitrile, methylacrylate, methylmethacrylate, methylvinylketone, a-methylstyrene and the like, but styrene is most preferably used.

The amount of comonomer used in manufacturing the conjugated diolefin copolymer is usually selected in a range of 50 percent or less, but it may be differently selected by depending on the diolefin configuration in the polymeric chain. For example, when the content of 1,2-bond units of diolefin is high, the content of comonomer can be increased.

In order to introduce a functional group into the ends of above conjugated diolefin polymer, a polymerization reaction solution may be treated with an electrophilic reagent e.g. ethylene oxide, alkylene sulfide, carbon dioxide, and carbon disulfide in the producing step of the conjugated diolefin homopolymer or copolymer and thereby the conjugated diolefin homopolymer or copolymer having respectively —OH radical, —SH radical, —COOH radical, or —CSSH radical may be obtained.

Then, in order to introduce carboxylic group or acid anhydride groups on the polymer chain, the said conjugated diolefin polymer may be mixed with e.g. $\alpha,\beta$-unsaturated dicarboxylic acid or acid anhydride thereof and then may be subjected to heat treatment.

When a vinyl compound is mixed with the conjugated diolefin polymer in accordance with the process of the present invention, the effect involving improvement of workability, saving of time for impregnation and setting and increase of mechanical strength of the product board or the like, may be occasionally obtained and its addition amount is selected in the range of about 0 to about 90 weight percent based on the amount of the polymer. But, when too much of the vinyl compound is used, the effect which is brought about by the use of the conjugated diolefin polymer may be attenuated. So, usually, the said amount is preferably in the range of about 70 weight percent or less.

The vinyl compound used in the present invention includes, aromatic vinyl compounds such as styrene and methyl styrene; acrylic acid, methacrylic acid, methyl acrylate, methacrylic acid or esters thereof; aliphatic dicarboxylate such as fumaric diester, i.e. dimethyl fumarate, maleic diester, i.e. diethyl maleate; and alkyl compounds such as dialkyl phthalate or like, and its choice is decided in compliance with characteristics which are required for the products and setting condition. For example, if the humidity resistance and increase of mechanical strength are required for the products, aromatic vinyl compounds, acrylic esters and methacrylic esters are adopted, and if dielectric property is required for the products, dialkylphthalate or styrene is empolyed.

After the processed ligneous material is impregnated with the diolefine polymer and cured in accordance with the process of the present invention, a catalyst may be preliminarily mixed with the polymer or the wood substance impregnated with the polymer is treated with a solution of catalyst before curing the polymer, so that the curing operation may be practised efficiently.

The catalyst for above objective is selected from compounds generally and widely used as radical initiators, such as, for example, benzoylperoxide, tert-butyl peroxide, dicumyl peroxide, methylethylketone peroxide, cummene hydroperoxide, dibutyl peroxide, 2,5-dimethyl-2,5-di(tert-butyl peroxy) hexine-3-, 2,5-dimethyl-2, 5-di (tert-butyl peroxy) hexane and azobis-isobutylonitrile.

As a curing accelerator which is employed singly or together with said catalyst for the purpose of abbreviating curing time and lowering curing temperature, there are cited, for example, metal oxides such as manganese dioxide and cobalt oxide, and heavy metal salts of carboxylic acid such as lead stearate, copper oleate, cobalt naphthenate, lead naphthenate and cobalt octoate.

As an amount of catalyst or accelerator, the former is selected in a range of about 0.1 to about 10 percent, in proportion to the total amount of resin, (the said total amount means the sum of conjugated diolefin polymer and vinyl compound. Hereinafter, this significance will be applicable) and the latter, as a conversion of weight of metal amount, is selected in the range of about 0.001 to about 1 percent to the said total amount. Those may be employed alone or as a mixture.

In the case the impregnation of polymer or its mixture is made by using a solution thereof, the solvent is selected from organic solvents, e.g., hydrocarbons such as solvent naphtha, toluene and xylene; alcohols such as n-butyl alcohol; esters such as ethyl acetate; ketones such as methylethyl ketone and acetone; ethers such as butyl Cellosolve; and hydrocarbon halides such as carbon tetrachloride etc. These may be employed alone or as a mixture.

If a solvent deficient in aqueous solubility is used for the above solution, the wood material to be treated can be satisfactorily impregnated by drying in order to sufficiently and uniformly accept the polymer. The concentration of said solution is selected to be as high as possible, insofar as workability may not be impaired and this is preferable from the economic viewpoint. Practically, the concentration is determined by taking in consideration the average molecular weight of polymer.

When the diolefin polymer is used to impregnate in the form of an emulsion, the polymer is mixed with an appropriate emulsifying agent or protective colloid agent, if necessary, with a vinyl compound, catalyst and curing agent, and the resulting mixture is added to water for emulsifying. Otherwise, the polymer mixture is added to an aqueous solution preliminarily containing an emulsifying agent and a protective colloid agent and agitated to produce the emulsion.

In the case of employment of an emulsion, the material to be treated is allowed to have some degree of moisture content. However, the treated material having a high moisture content requires a long time to be impregnated with a desired amount of polymer and has a tendency to prolong the setting time.

The total amount of the resin impregnated in the processed ligneous material in the present invention may be decided in the appropriate range in considering physical property and economic requirements of the wood substance. The amount is preferably selected to be more than 2 percent in proportion to the wood substance produced. If the amount is less than the above percent, a satisfactory effect cannot be expected.

An "immersion process" is usually used, when a large amount of polymer is particularly necessary or desired in the product. However, in the case of impregnating with only a comparatively small amount of polymer, a spraying process, coating process or the like is employed.

When, the combination of the 1,2-bond content in the conjugated diolefin polymer, catalyst, accelerator, and vinyl compound are appropriately selected, the curing operation can be practised at normal temperature. However, the curing operation is usually performed by heating the impregnated fiber board at a temperature of 50 to 200° C., during about 10 minutes to about 2 hours. The effect in the process of the invention can be furthermore enlarged, by the application of an appropriate additional pressure in the curing step. In this case, a pressure in the range of 40 to 100 kg./cm$^2$ is employed.

Also, in carrying out the present invention, insofar as it is not contrary to the objective thereof, other reactive polymers such as unsaturated polyesters and alkyd resins may be used as a polymer mixture together with the conjugated diolefin polymer.

Improved fiber board is particularly chosen as the preferred wood substance embodiment of this invention. However, improved laminated wood or fiber board, particle board, moulding of particle board, and analogous wood substance are also embodiments of this invention.

In case of green wood and lumber, produced by simple mechanical processing the curing operation is difficult. Those are not included in the objective of the present invention.

For the purpose of giving those skilled in the art a better understanding of the invention the following illustrative examples are given wherein "part" and "percent (%)" described hereinafter are units by weight base.

EXAMPLE I

Metallic sodium was dispersed in tetrahydrofuran in which 1,2-diphenylbenzene was dissolved.

Butadiene was added and the resulting solution of the polymerization reaction was treated with water and thereby, polybutadiene polymer which has an average molecular weight number of 4,000, and 94 percent of 1,2-bond, 6 percent of 1,4-trans bond and 1,600 poise of viscosity at 45° C. was obtained.

40 parts of styrene and 2 parts of dicumyl peroxide were added in 60 parts of the said polybutadiene polymer and those were satisfactorily agitated and dissolved and thereby a resin solution was obtained. A hard fiber board in a size of 30 cm. length x 30 cm. width x 3.5 mm. thickness (S350, one face sanded smoothly) was immersed for 5 minutes into the said resin solution at normal temperature and then a surplus resin solution which adhered onto the surfaces was scraped with a blade. A curing treatment was practised on the workpiece for one hour in a dry oven of hot air system at 160° C., and the hard board having improved quality (I) (of Table I) was obtained.

EXAMPLE II

Butadiene was added into tetrahydrofuran in which dispersed particles of metallic sodium were suspended and ethylene oxide was added-in the resulting solution of the polymerization reaction. The resulting solution was hydrolyzed and polybutadienediol which had an average molecular weight number of 3,500, a hydroxyl value of 35.2, 93.4 percent of 1,2-bond, 6.6 percent of 1,4-trans bond and 780 poise of viscosity at 45° C. was obtained. 45 parts of styrene monomer and 2 parts of dicumyl peroxide were added in 55 parts of the said polybutadienediol and those were satisfactorily agitated and dissolved and thereby a resin solution was prepared.

The same type of hard board piece as in Example I was immersed in the resin solution for 5 minutes at a normal temperature and surplus resin solution which adhered onto the surfaces was scraped with a blade. A curing treatment was practised on the workpiece for one hour in a dry oven of hot air system at 160° C., and the hard board having improve quality (II) (of Table I) was obtained.

EXAMPLE III

Butadiene homopolymer which has an average molecular weight number of 2,500, with 72.5 percent of 1,2-bond, 27.5 percent of 1,4-trans bond and 60 poise of viscosity at 45° C. was prepared by the same process in Example I. 30 parts of methacrylic acid and 2 parts of t-butyl perbenzoate were added in 70 parts of the said butadiene homopolymer and those were satisfactorily agitated and dissolved and then a resin solution was prepared. Both surfaces of the same type of hard board as in Example I were coated with said resin solution at a normal temperature by means of a roll coater. A curing treatment was practised on the workpiece in a dry oven of hot air system at 80° C. during 30 minutes and further at 150° C. during one hour and the hard board having improved quality (III) was obtained.

EXAMPLE IV 20 parts of unsaturated polyester resin having an acid value of 84.5, 30 parts of styrene monomer and 2 parts of dicumyl peroxide were added into 50 parts of butadiene homopolymer in Example III and those were satisfactorily agitated and a homogeneous resin solution was prepared. The same type of hard board as in Example I was immersed in the said resin solution at 50° C. for 10 minutes and then was taken out of it and a surplus resin solution which adhered onto the surfaces was scraped with a blade. A curing treatment was practised on the workpiece for one hour in a dry oven of hot air system at 160° C. and the hard board having the improved quality (IV) (of Table I) was obtained.

EXAMPLE V

A mixture of butadiene and styrene was added in a system of tetrahydrofuran in which 1,2-diphenylbenzene was dissolved and dispersed particles of metallic sodium were added, the resulting solution of the polymerization reaction was treated with water and thereby, a copolymer of butadiene-styrene which had 71 percent of butadiene polymerization chain unit, 29 percent of styrene unit, 67 percent of 1,2-bond in butadiene unit and 33 percent of 1,4-bond was prepared. 30 parts of styrene monomer and 2 parts of dicumyl peroxide were added in 70 parts of the said copolymer of butadiene-styrene and those were satisfactorily agitated and thereby a homogeneous resin solution was prepared.

The same type of hard board as in Example I was immersed in said resin solution at a normal temperature for 10 minutes and then taken out of the solution and a surplus resin solution which adhered on the surfaces was scraped with a blade. A curing treatment was practised on the workpiece in a dry oven of hot water system at 160° C. for one hour and the hard board having improved quality (V) (of Table I) was obtained.

COMPARABLE EXAMPLE I

The same type of hard board as in Example I was immersed in a temper oil having as a main ingredient of tall oil which is used for improving the quality of hard board and sold on the market. This immersion was continued for 5 minutes at a normal temperature and then a surplus temper oil which adhered on to both surfaces of the said hard board was scraped. A heat treatment was practised on it in a dry oven of hot air system at 160° C. for one hour and the hard board having improved quality (VI) (of Table I) was obtained.

COMPARABLE EXAMPLE II

The same hard board as in Example I was immersed for 10 minutes in a solution which was obtained by mixing homogeneously 100 parts of styrene monomer with 2 parts of dicumyl peroxide. A heat treatment was practised on the workpiece for one hour at 150° C. and thereby, a sample (VII) (of Table I) was obtained.

TESTING EXAMPLE

The bending strength and hygroscopic degree for the hard board samples of (I) to (VII) which were obtained in the said examples of I to V and the said Comparable Examples of I to II were tested in accordance with the standard of JIS-A-5907 (1961) and surface intrinsic resistance for said hard board samples was measured in accordance with the method of ASTMD 257 and those testing results are set forth in Table I.

TABLE I

Samples by the present invention

| Sample | Impregnated amount of resin (percent) | Bending strength (kg./cm.²) | Hygroscopic degree (1%) | Surface intrinsic resistance (Ω) |
|---|---|---|---|---|
| Example I(I) | 14.8 | 724 | 6.0 | $3.8 \times 10^{13}$ |
| Example II(II) | 12.1 | 710 | 7.7 | $2.0 \times 10^{13}$ |
| Example III (III) | 7.5 | 630 | 6.5 | $5.6 \times 10^{12}$ |
| Example IV (IV) | 11.5 | 575 | 7.0 | $2.7 \times 10^{13}$ |
| Example V(V) | 10.8 | 610 | 6.7 | $1.9 \times 10^{13}$ |

Samples by the comparable examples

| Example I(VI) | 16.2 | 392 | 12.5 | $8.5 \times 10^{11}$ |
| Example II(VII) | 1.2 | 369 | 20.7 | $2.1 \times 10^{10}$ |
| Untested sample | 0 | 370 | 21.8 | $1.1 \times 10^{10}$ |

As set forth in the results of the above table, hard board samples having improved quality in accordance with the process of the present invention show the remarkably improved values of mechanical strength and water proof and furthermore an improved degree of electric insulation.

The present invention is not to be confused with the polymerization of butadiene as described by Wayne R. Sorenson et al. "Preparative Methods of Physical Chemistry," Interscience Publishers, 1961, pages 151, 152, 215, 227.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:
1. A process for producing a ligneous finished piece having improved properties, which comprises impregnating a ligneous workpiece with a resin solution comprising a conjugated diolefin containing polymer selected from the group consisting of butadiene homopolymer, butadiene-styrene copolymer containing 50% or less styrene and mixtures thereof, and an addition agent selected from the group consisting of styrene, methacrylic acid, and unsaturated polyester, wherein the diolefin containing polymer has an average molecular weight in the range of from about 500 to about 20,000 and at least about 50 percent of the butadiene units have a 1,2-bond and curing said polymer-addition agent solution at a temperature up to 200° C.

2. The process claimed in claim 1 wherein said butadiene units having a 1,2-bond have the following structural formula:

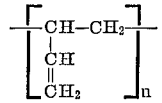

3. The process as claimed in claim 2 wherein there is at least about 80% of said units having the 1,2-bond.

4. The process as claimed in claim 2 wherein said diolefin containing polymer has a molecular weight of between 2,000 to 10,000.

5. The process as claimed in claim 2 wherein said material forms a polymer main chain and side chains, said main chain having functional groups at the ends thereof comprising functional groups selected from the group consisting of an —OH radical, —SH radical, —COOH radical, and —CSSH radical.

6. The process as claimed in claim 2 wherein said material forms a polymer main chain and side chains and at least one of said side chains has attached thereto material selected from the group consisting of carboxylic radical and acid anhydride.

7. The process of claim 1 wherein said addition agent is styrene and used in the amount of about 70% or less based on the weight of the diolefin polymer.

8. An improved ligneous article prepared according to claim 1.

9. The article as claimed in claim 8 wherein said butadiene units having a 1,2-bond have the following structural formula:

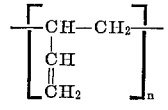

References Cited

UNITED STATES PATENTS

| 3,083,118 | 3/1963 | Bridgeford | 117—148 |
| 3,246,054 | 4/1966 | Guenther | 117—93.31 |
| 3,247,012 | 4/1966 | Burlant | 117—93.31 |
| 3,401,213 | 9/1968 | Trementozzi | 117—148 |
| 3,437,514 | 4/1969 | Burlant | 117—93.31 |

WILLIAM D. MARTIN, Primary Examiner

W. R. TRENOR, Assistant Examiner

U.S. Cl. X.R.

117—161; 260—94.2